Aug. 22, 1950     F. A. LETNER     2,519,774
AUTOMATIC EMERGENCY ACTUATOR FOR POWER BRAKES
Filed Nov. 20, 1946     3 Sheets-Sheet 1

Inventor

Frank A. Letner

By Clarence A. O'Brien
and Harvey B. Jacobson
Attorneys

Aug. 22, 1950  F. A. LETNER  2,519,774
AUTOMATIC EMERGENCY ACTUATOR FOR POWER BRAKES
Filed Nov. 20, 1946  3 Sheets-Sheet 2
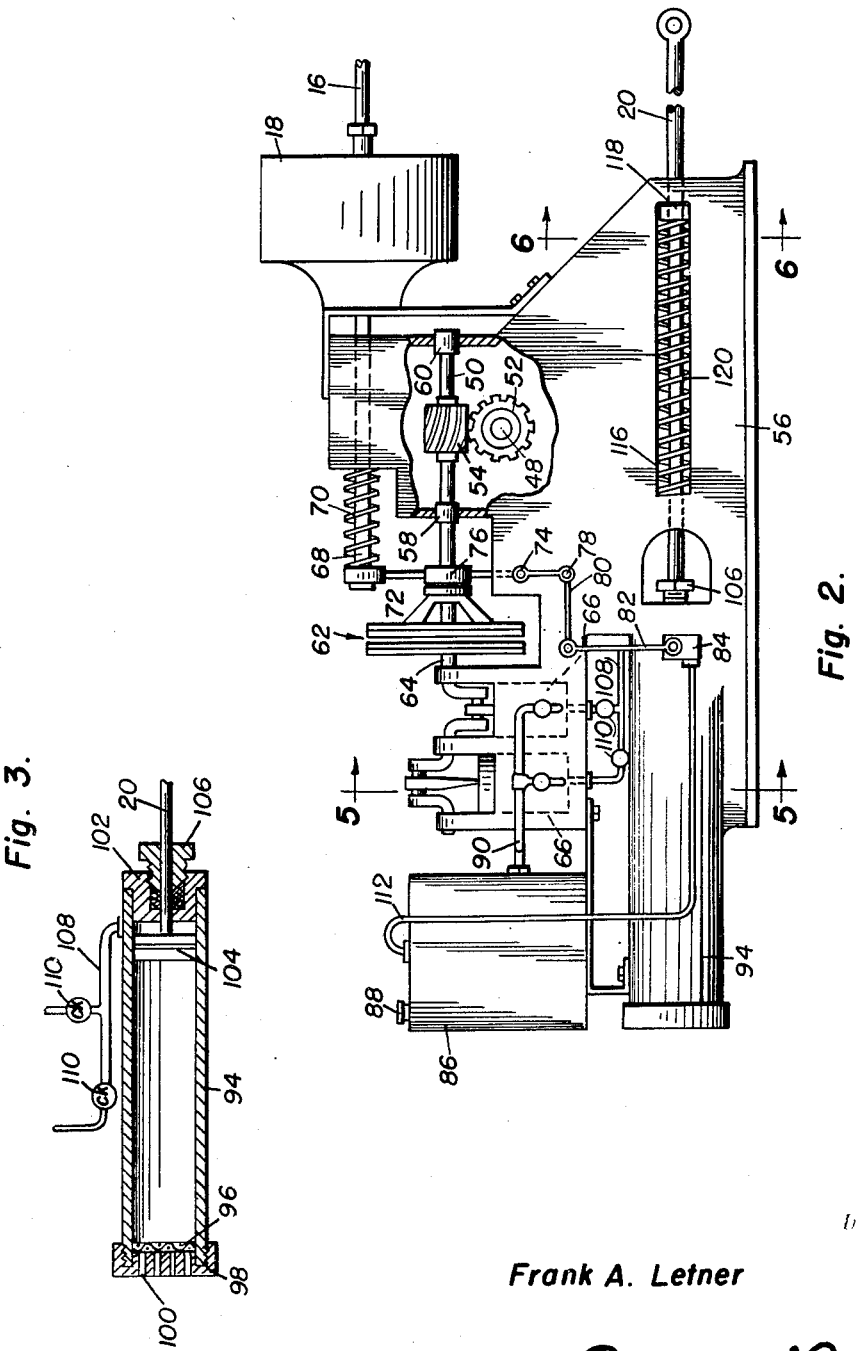
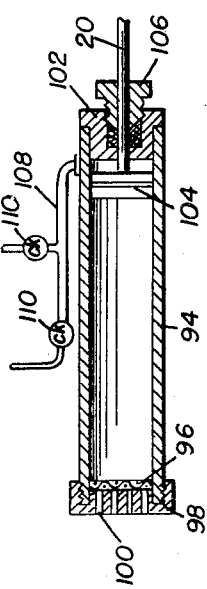
*Frank A. Letner*

Aug. 22, 1950      F. A. LETNER      2,519,774

AUTOMATIC EMERGENCY ACTUATOR FOR POWER BRAKES

Filed Nov. 20, 1946      3 Sheets-Sheet 3

*Inventor*

Frank A. Letner

By *Clarence A. O'Brien and Harvey B. Jacobson*
Attorneys

Patented Aug. 22, 1950

2,519,774

UNITED STATES PATENT OFFICE 2,519,774

AUTOMATIC EMERGENCY ACTUATOR FOR POWER BRAKES

Frank A. Letner, Del Paso Heights, Calif., assignor of one-half to William L. Davis, Augusta, Ga.

Application November 20, 1946, Serial No. 711,154

10 Claims. (Cl. 188—106)

The present invention relates to novel and useful improvements in automatic actuator for power brakes and more specifically pertains to an apparatus which may be attached to a conventional power brake system of vehicles for the purpose of automatically applying the brake upon the failure of the power brake system of the vehicle.

The principal objects of my invention reside in providing an apparatus which may readily be attached to existing vehicles having a power brake operating system; which is so associated with the conventional power brake operating system that it remains out of operation when the pressure medium of the power brake system is normal or adequate, but is thrown into operation when the pressure of the power brake system falls below a predetermined safe minimum; which makes use of the movement of the vehicle to produce a power actuating means for applying the brakes of the vehicles; which is provided with novel, efficient and simple control means for selectively energizing or de-energizing the apparatus.

Other ancillary objects of the invention which will later become apparent as the following description proceeds, are realized by my invention, one embodiment of which has been illustrated in the accompanying drawings, wherein:

Figure 2 is a side elevational view of the operating unit of my invention;

Figure 3 is a longitudinal sectional view through the fluid pressure cylinder and piston for applying the emergency brakes;

Figure 1:
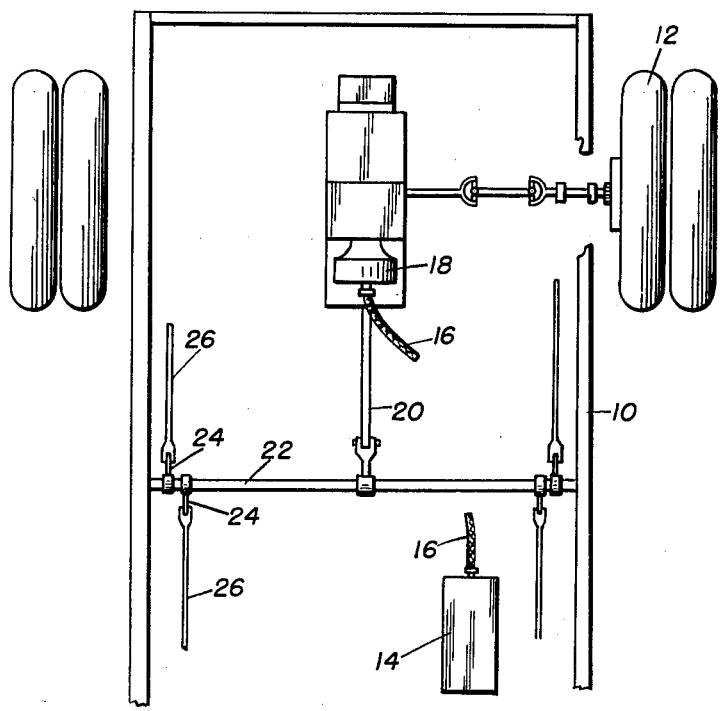
Figure 1 is a diagrammatic top plan view of a portion of a vehicle frame showing the relative position of the various parts of my invention.

Referring now more specifically to the attached drawings, wherein like numerals designate similar parts throughout the various views, reference is made first to Figure 1 for a general understanding of the invention, and wherein 10 designates a portion of a vehicle frame which is provided with the usual vehicle wheels 12 and a fluid pressure reservoir 14 which is connected by any suitable means for supplying pressure fluid to any conventional type of fluid pressure power brake operating mechanism, not shown. The reservoir 14 is provided with a flexible conduit 16 establishing free communication with a control cylinder 18 for controlling the operation of my safety attachment upon failure of the power brake operating pressure in the reservoir 14. A connecting rod 20 operated by my safety device in a manner to be subsequently set forth is suitably connected to a lay shaft 22 which is provided with arms 24 for operating the actuating rods 26 which are connected to the brake operating arms of the vehicle for actuation thereof independently of the power brake operating means in a manner to be subsequently set forth.

Figure 4:
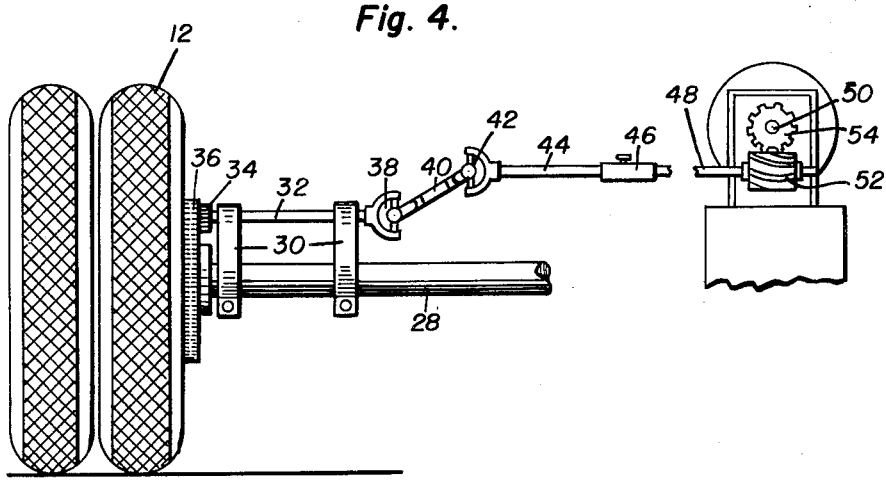
Figure 4 is a detail in elevation showing the power supplying means for my invention.
Figure 5:
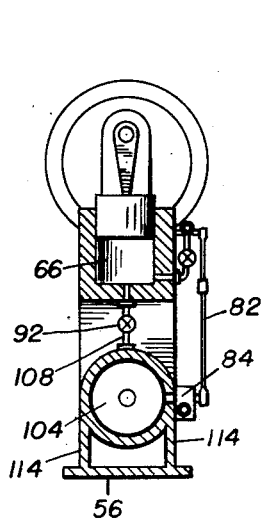
Figure 5 is a vertical sectional view being taken substantially upon the line 5—5 of Figure 2.
Figure 6:
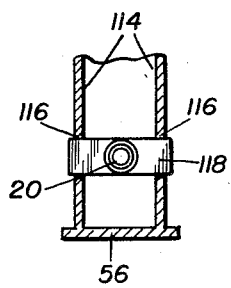
Figure 6 is a detail in vertical section being taken substantially upon the line 6—6 of Figure 2.

As shown best in Figure 4, the rear axle housing 28 of the vehicle has adjustably secured thereon a pair of clamps 30 which rotatably support a drive shaft 32 upon whose outer end is mounted a gear 34 constantly in mesh with an internal gear 36 mounted in any suitable manner upon the hub of one of the vehicle wheels 12. The inner end of the shaft 32 is connected by means of a universal joint 38, a connecting shaft 40, universal joint 42, shaft 44, and an extension coupling 46 and shaft 48 with a drive shaft 50. The coupling 46 is provided for the purpose for varying the length of the driving shafts 44 and 48 in order to fit the device to various types and models of vehicles, and the coupling shaft 40 and universal joints 38 and 42 further assist in locating the apparatus in any desired location upon a vehicle. As shown in Figures 2 and 4, constantly meshing gears 52 and 54 drivingly connect the shafts 48 and 50 respectively.

Attention is now directed more specifically to Figure 2, wherein a suitable casing or frame work 56 is provided which is adapted for rigid engagement with the frame of a vehicle in any suitable manner and in any desired location. The shaft 48 is journaled in this frame work 56 in any preferred manner, not shown, while the shaft 50 is rotatably mounted therein as by bearings 58 and 60. The shaft 50 is connected by means of a clutch indicated generally at 62 with the crank shaft 64 of a reciprocating piston pumping unit having cylinders 66. The pressure responsive cylinder 18 is mounted upon the frame work 56 and is provided with an axially extending reciprocable operating rod 68 which is reciprocated by any conventional mechanism within the cylinder 18, not shown, in response to pressure variations within the cylinder 18 as communicated or introduced by the conduit 16 in a manner to be subsequently set forth. A coil spring 70 normally urges the rod 68 outwardly of the cylinder 18 against the action of the pressure fluid introduced by the conduit 16. An operating lever 72 has its upper end connected in any suitable manner to the rod 68, and is fulcrumed as at 74 to the casing 56. Intermediate its ends, the lever 72 is connected to a clutch control element 76 for operating the clutch 62 and at its outer end is pivotally connected as at 78 to a control link 80 pivoted to a lever 82 for actuation of a valve indicated generally at 84. A fluid tank 86 is secured in any suitable position as upon the casing 56 and is provided with a conventional filling cap 88. A suction line 90 connects the tank 86 with the cylinder 66 of the pumping unit and is provided with non-return check valves 92 preventing reverse flow through the passage 90 from the pump into the tank 86. Preferably formed integrally with the casing member 56, is a horizontally disposed cylinder 94 which is open at both ends as shown in Figure 3. The outer end of the cylinder is provided with a filtering element 96 and a detachable closure cap 98 which is apertured or perforated as at 100 to freely emit the passage of air therethrough for a purpose to be subsequently set forth. At its other end, the cylinder 94 is provided with a head 102 and which is bored to slidingly receive the rod 20 referred to hereinbefore. A piston 104 is secured upon the end of the rod 20 and is slidably disposed in the cylindrical member 94 while a suitable packing means 106 prevents the escape of pressure fluid through the head 102. A pump pressure or discharge line 108 is connected with the cylinder 94 behind the piston 104 and is in communication with the pump cylinder 66 through the non-return check valves 110 which permits flow of fluid from the pump to the cylinder but prevent return flow. A fluid return line 112 is in communication by means of the valve member 84 with the pressure chamber between the piston 104 and the cylinder head 102, and is in free communication with the interior of the reservoir 86. The actuating rod 20 extends through the casing 56 between a pair of parallel rolls 114 which rolls are provided with parallel longitudinally disposed guide slots 116. A transverse guide and stop member 118 is rigidly secured to the rod 20 and is disposed for sliding movement in the slot 116, a return spring 120 encircling the rod 20 between the stop 118 and one end of the end slotted portion of the casing 56.

Figure 7:
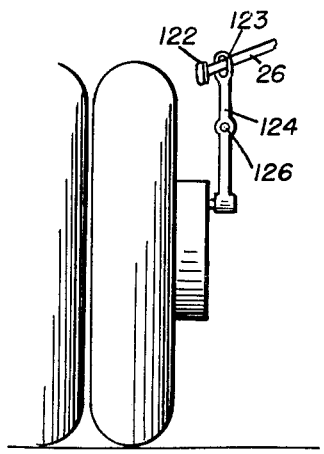
Figure 7 is a detail view in elevation showing the manner of attaching my invention to the service brakes of a vehicle.

As set forth above, the operating rod 20 is operatively connected with the brake actuating linkage 26 which is provided with headed portions 122. The rods 26 extend through suitable apertures 123 in the outer end of brake operating arms 124 adapted to operate the vehicle brakes in the conventional manner, it being noted as shown in Figure 7, that the brake operating arms 124 are provided with bores 126 for engagement by the customary power brake operating mechanism, not shown. As will be understood, the aperture 123 is freely slidable upon the linkage 26 when the lever 124 is operated by the service brake through the eyelet 126 in the usual manner, but when the linkage 26 is actuated, the headed portion 122 is moved to take-up the slack in the system and operate the lever 124.

The operation of my device is as follows. As long as the usual fluid pressure or vacuum of the conventional power brake operating system is at its normal value, and communicated by the conduit 16 to the control cylinder 18, said fluid pressure opposes the action of spring 70 and urges the control rod 68 inwardly of the cylinder 18 against the action of said spring. When the device is maintained in this condition, the lever 72 through its attachment 76 disengages the clutch 62, whereby the driving shaft 50 is disengaged from the crank shaft 64 of the pump. In this position of operation, the connections 72, 74, 78, 80 and 82 simultaneously retain the valve 84 in a position whereby the interior of the pressure chamber between the piston 104 and head 102 is vented to the fluid storage tank 86, thereby rendering the piston 104, operating rod 20, linkage 26 inoperative to apply the vehicle brakes. It may be here noted that during the entire time the vehicle wheels are in motion, the connecting means 36, 34, 32, 38, 40, 42, 44, 46, 48, 50, 52 and 54 are maintaining the shaft 50 in constant rotation. In other words, the shaft 50 is in continuous and constant engagement with the wheels of the vehicle. When now the operating pressure of the vehicle reservoir 14 falls below the safe operating pressure, this drop in pressure is communicated to the cylinder 18, and now permits the spring 70 to urge the rod 68 outwardly of the cylinder. The spring 70 thereupon urges the rod 68 into a position which rotates the lever 72 about its axis 74, and through the connection 76 engages the clutch 62 whereby the driving shaft 50 is placed in driving engagement with the crank shaft 64 of the pump unit. At the same time, the interconnected linkage causes the closing of the valve member 84 thereby breaking the free connection between the pressure chamber of the cylinder 94 and the fluid reservoir 86. In this condition, any movement of the vehicle wheels 12 causes operation of the pumping unit and draws in fluid from the reservoir 86 by means of the conduit 90 and check valves 92, into the cylinder 66 and discharges the same under pressure through the conduit 108 and valves 110 into the pressure chamber of the cylinder 94. This fluid under pressure urges the piston inwardly of the cylinder, and thereby actuates the rod 20 against the action of the return spring 120 to operate the linkage 26 and apply the service brakes through operation of the brake lever or brake arm 124. I desire at this time to point out that this operation occurs regardless of whether the vehicle is in motion and experiences a sudden failure of the fluid pressure of the power brakes or whether the vehicle during a period of standing should gradually lose the operating pressure of the power brakes. In the latter event, if the vehicle starts to move, the operation of the pumping unit will build up pressure in the pressure chamber of the cylinder 94 to apply the brakes; and this pressure is maintained by means of the closing of the valve 84, and the non-return check valves 110, to set and hold the brakes in their applied position. This brake applying pressure of my safety device can only be released by a restoration of the service brake pressure of the automatic power brake system, when the said pressure has been applied to the control cylinder through the conduit 16, and thereby releases the brake application of my safety device in the manner mentioned herein before.

The cylinder head 98 by means of the apertures 100 provides free communication of the outer end of the piston 104 with the atmosphere, to thereby prevent any dashpot effect thereon, while the filtering or cleaning means 96 serves to exclude the presence of dirt, grit or the like from the cylinder 94.

I claim:

1. An auxiliary actuator system for braking a wheeled vehicle employing a main pressure brake system, said auxiliary actuator system being rendered operative upon default of the main brake system and including an actuating linkage for operating the brakes of a vehicle, a first means for operating said actuating linkage, a second means responsive to motion of said vehicle for supplying fluid pressure to said first means, a third means responsive to a predetermined pressure in the power service brake system of said vehicle for preventing operation of said second means, said first means including a cylinder, a piston in said cylinder, a connecting rod operatively secured to said piston and said actuating linkage, a spring urging said connecting rod and said actuating linkage into inoperative position, a guide means for restraining said connecting rod to straight line motion.

2. An auxiliary actuator system for braking a vehicle employing a main pressure power brake system, said auxiliary actuator system being operative upon deactivation of the main brake system and including an actuating linkage for operating the brakes of a vehicle; means for operating said actuating linkage, means responsive to the motion of the vehicle for actuating said operating means, clutch means for said last means and means reactive to a default of the main brake system for actuating said clutch means.

3. An auxiliary actuator system for braking a wheeled vehicle employing a main pressure power brake system, said auxiliary actuator system being operative upon deactivation of the main brake system and including an actuating linkage for operating the brakes of a vehicle, means for operating said actuating linkage, power means associated with the wheels of the vehicle and responsive to the rotation thereof for actuating said operating means, clutch means for said last means and means responsive to a loss of operating pressure in the main brake system for actuating said clutch means.

4. An auxiliary actuator system for braking a wheeled vehicle employing a main pressure power brake system, said auxiliary actuator system being operative upon deactivation of the main brake system and including an actuating linkage for operating the brakes of a vehicle, means for operating said linkage, means responsive to motion of the vehicle for supplying fluid pressure to said operating means, said last means including a fluid pressure pump and power means for said pump associated with and driven by the wheels of the vehicle, clutch means for said power means, and means responsive to a predetermined pressure in the main pressure system of said vehicle for controlling said clutch means.

5. An auxiliary actuator system for braking a wheeled vehicle employing a main pressure power brake system, said auxiliary actuator system being operative upon deactivation of the main brake system and including an actuating linkage for operating the brakes of a vehicle, pressure actuated means for operating said linkage, means responsive to motion of the vehicle for supplying a fluid pressure to said foregoing means, said last means including a fluid pressure pump and driving means for said pump, said driving means being drivingly associated with the wheels of the vehicle and reactive to the rotation thereof, clutch means connecting said driving means to the pump, means responsive to a predetermined pressure in the main power brake system for controlling the operation of the clutch means, said last means including a pressure responsive member and a member operatively connecting said pressure responsive member and said clutch means.

6. An auxiliary actuator system for braking a wheeled vehicle employing a main pressure power brake system, said auxiliary actuator system being operative upon deactivation of the main brake system and including an actuating linkage for operating the brakes of a vehicle, pressure operated means for actuating said linkage, means responsive to motion of the vehicle for supplying a fluid pressure to said foregoing means, said last means including a fluid pressure pump, driving means for said pump actuated by said vehicle, a fluid storage tank, said pump having a suction line communicating with said tank and a pressure line connecting with said pressure operated means, non-return valves in said suction and pressure lines, a return line connecting said pressure operated means to said tank, valve means in said return line, clutch means connecting said driving means to the pump, and means responsive to a loss of operating pressure of the main brake system for controlling the operation of the clutch means.

7. An auxiliary actuator system for braking a wheeled vehicle employing a main pressure power brake system, said auxiliary actuator system being operative upon deactivation of the main brake system and including an actuating linkage for operating the brakes of a vehicle, pressure operated means for actuating said linkage, means responsive to motion of the vehicle for supplying a fluid pressure to said foregoing means, said last means including a fluid pressure pump, driving means for said pump actuated by said vehicle, a fluid storage tank, said pump having a suction line communicating with said tank and a pressure line connecting with said pressure operated means, non-return valves in said suction and pressure lines, a return line connecting said pressure operated means to said tank, valve means in said return line, clutch means connecting said driving means to the pump, and means responsive to a loss of operating pressure of the main brake system for controlling the operation of the clutch means.

8. An auxiliary actuator system for braking a wheeled vehicle employing a main pressure power brake system, said auxiliary actuator system being operative upon deactivation of the main brake system and including an actuating linkage for operating the brakes of a vehicle, pressure operated means for operating said linkage, means responsive to motion of the vehicle for supplying pressure to said operating means for the linkage, clutch means for said last means, means responsive to a working pressure in the main power brake system for retaining said clutch means in a disengaged relation and means reactive to deleterious reduction of pressure in the main brake system for engaging said clutch means.

9. An auxiliary actuator unit for braking a vehicle equipped with a main pressure power brake system, said auxiliary actuator unit being inoperative during normal working operations of the main power brake system and including operating means associated with the brakes of a vehicle, pressure operated actuating means for said brake operating means; power means for said actuating means, said power means being actuated responsive to and in accordance with motion of the vehicle, clutch means for said power means, means responsive to a normal operating pressure in the main brake system for retaining said clutch means disengaged and means for engaging said clutch means responsive to a default of the main brake system.

10. An auxiliary actuator unit for braking a vehicle equipped with a main pressure power brake system, said auxiliary actuator unit being inoperative during normal working operations of the main power brake system and including linkage means associated with the brakes of a vehicle, pressure operated actuating means for said linkage means, means for supplying a fluid pressure to said foregoing means, said supplying means including a fluid pressure pump, driving means for said pump associated with the wheels of the vehicle, clutch means connecting said driving means to the pump, means responsive to a normal operating pressure in the main brake system for retaining said clutch means disengaged and means for engaging said clutch means responsive to a default of the main brake system.

FRANK A. LETNER.

REFERENCES CITED

The following references are of record in the file of this patent:

UNITED STATES PATENTS

| Number | Name | Date |
|---|---|---|
| 1,903,973 | Boughton | Apr. 18, 1933 |
| 2,142,514 | Jones | Jan. 3, 1939 |